Patented Feb. 6, 1940

2,188,980

UNITED STATES PATENT OFFICE 2,188,980

RUBBER ACCELERATOR COMPOSITIONS

Ludwig Meuser, Naugatuck, Conn., assignor, by mesne assignments, to United States Rubber Company, New York, N. Y., a corporation of New Jersey No Drawing. Application March 20, 1936, Serial No. 69,977

12 Claims. (Cl. 260—793)

This invention relates to improvements in rubber accelerator compositions, and more particularly to means whereby to render or convert water-insoluble thiuram sulphide accelerators to products more suitable for latex compounding. It also relates to the rubber products produced therewith.

According to the invention a substantially water insoluble thiuram sulphide type of vulcanization accelerator is heated, preferably boiled, with an alkali-metal salt of an acid whose salt forming anion is a polyvalent radical capable of forming a double salt with sodium and ammonium cations, until the thiuram sulphide dissolves. The clear solution contains the new accelerator material. It may be used as such, concentrated, or diluted further. Examples of such acids are sellenous, tellurous, and sulphurous acid. These acids form double salts with sodium and ammonium, and subscribe to the type $H_2XO_3$ where X is a non-oxygen member of the oxygen family of the periodic table.

The invention is illustrated by the following examples with a preferred salt, sodium sulphite, reacted with tetra alkyl thiuram sulphides among which the more outstanding are the tetra-methyl thiuram disulphide, and the tetra methyl thiuram mono-sulphide:

*Example 1.*—90 grams of tetra-methyl thiuram disulphide are boiled for several hours, in 500 grams of a water solution containing 100 grams of anhydrous sodium sulphite. The liquid is then cooled and filtered free of impurities. The chemical nature of the solution is not clearly understood; it may be that the alkali salt forms a complex salt or some sort of a water soluble double salt with the thiuram sulphide.

The solution may be used as such, as the accelerator agent, or concentrated, or diluted. In the following test, the solution was diluted to about 1438 grams with water. A latex composition, suitable for making a surgeon's glove on a former, by the dipping and coagulation method, was compounded with 32% by weight of the liquid accelerator product based on the rubber content of the latex composition. This is figured as giving an amount of active accelerator constituent equivalent to 2% by weight of tetramethylthiuram disulphide. The uncured rubber glove deposited on the former, when given a water cure at 100° C., for 15 and 30 minutes respectively, and tested, showed the following tensiles at break: 4160 lbs./sq. in. for the 15 minute period, and 3320 lbs./sq. in. for the 30 minute period.

When a similar glove was air-cured at 100° C. for 45 and 60 minutes respectively, the tensiles were 5060 lbs./sq. in. for the 45 minute period, and 4920 lbs./sq. in. for the 60 minute period.

The proportion of thiuram sulphide to the salt may be varied with the salt slightly in excess, or the amounts may be equal as shown by the following example.

*Example 2.*—100 grams of tetra methyl thiuram monosulphide are boiled with 500 grams of a water solution of 100 grams of sodium sulphite until the monosulphide disappears in solution. The clear solution on cooling may be treated and used similarly to the corresponding sulphide.

Films obtained from a creamed latex composition containing approximately 7% by weight (based on the rubber) of the liquid accelerator of Example 2, give good results, where the films are formed by dipping and drying, as well as where the films are formed by dipping and acid coagulating the latex films. For a 30 minute cure in air at 100° C., the acid coagulated film showed a tensile of 4255 lbs./sq. in., as compared to 5596 lbs./sq. in. for the dried film.

The accelerators are stable toward the preservative ($NH_3$) of the latex, do not coagulate or destabilize the latex, and cause no undesirable pre-vulcanization of the latex after standing one week at room temperature. The stocks also age well.

The crystalline or dry forms of Example 1 and Example 2 products, obtained from concentrating by evaporating to dryness the respective solutions, may also be used in the vulcanization of regular solid milled rubbers, as shown by the following tests on mixes A and B. The parts are by weight. Mix A corresponds to base mix

| | Parts |
|---|---|
| Pale crepe | 100 |
| Zinc oxide | 10 |
| Lithopone | 40 |
| Whiting | 60 |
| Sulphur | 3 |
| Zinc soaps of cocoanut oil acids | 0.50 | to which is added 0.72 parts of the crystalline product from Example 1 product. Mix B corresponds to the same base mix to which is added approximately 0.42 parts of the crystalline product for Example 2 product.

The two mixes were cured at 20 pounds/sq. in. steam pressure for the unaged and oxygen aged tests, and at 5 pounds/sq. in. for the scorch test. T represents tensiles in pounds/sq. in. at break, and E represents percent elongation at break.

Table I
UNAGED

| Cure in minutes | Mix A | | Mix B | |
|---|---|---|---|---|
| | T | E | T | E |
| 10 | 1990 | 723 | 1380 | 700 |
| 15 | 2300 | 746 | 1750 | 700 |
| 20 | 2300 | 700 | 1950 | 700 |
| 30 | 2460 | 706 | 2350 | 700 |
| 45 | 2410 | 700 | 2170 | 696 |

AGED 48 HOURS IN OXYGEN BOMB

| | | | | |
|---|---|---|---|---|
| 10 | 1370 | 700 | 700 | 633 |
| 15 | 1570 | 700 | 1090 | 653 |
| 20 | 1620 | 706 | 1200 | 653 |
| 30 | 1020 | 586 | 1020 | 626 |
| 45 | 0 | 143 | 280 | 413 |

SCORCH TEST

| | | | | |
|---|---|---|---|---|
| 10 | 637 | 797 | 272 | 822 |
| 15 | 1376 | 763 | 772 | 745 |
| 20 | 1975 | 705 | 1132 | 732 |
| 30 | 2557 | 700 | 1935 | 737 |
| 45 | 2720 | 685 | 2453 | 670 |

The accelerators may be used in admixture, or in conjunction with other organic accelerators. They are compatible with accelerators of the mercapto-arylene-thiazole type, allowing thereby not only a reduction in the usually required amounts of the individual accelerators, but providing for more durable products. For example, where one half of the accelerator of Example 2 is replaced by the formaldehyde-aniline derivative of mercaptobenzothiazole, it was found that the tensiles for the 30 minutes cure rise approximately 20-25%.

The accelerators of the present invention may be used as compounding ingredients for the latex, prior to vulcanization, or the uncured rubber products may be cured by immersion in a solution of the accelerator. The compounded latex may also be vulcanized in latex form. The accelerator may be used with or without the addition of other adjuvants suitable to or required for the desired final rubber product. The term rubber herein is to be construed broadly as including caoutchouc, gutta percha, balata, synthetic rubber, rubber isomers. The latex may be a natural one or one artificially prepared from crude, or reclaimed or scrap rubber.

The invention is not to be construed as limited to the illustrative examples, variations in proportions and types of the reagents being permissible, for example other alkali-metal salts may be used such as those of potassium, and other substituted thiuram sulphides may be treated such as the corresponding penta-methylene, morpholine, or arylated thiuram sulphides, all of which is within the spirit of the invention defined by the appended claims.

Having thus described my invention, what I claim and desire to protect by Letters Patent is:

1. A process which comprises heating a substantially water-insoluble thiuram sulphide vulcanization accelerator with an aqueous solution of an alkali-metal salt of an acid of the type $H_2XO_3$ where X is a non-oxygen member of the oxygen family of the periodic table, until the sulphide substantially completely dissolves in said solution, and recovering the water soluble product of reaction.

2. A process which comprises boiling a substantially water-insoluble thiuram sulphide vulcanization accelerator with an aqueous solution of an alkali-metal salt of an acid of the type $H_2XO_3$, where X is a non-oxygen member of the oxygen family of the periodic table, and recovering the water soluble product of reaction.

3. A process which comprises heating tetramethyl thiuram disulphide with an aqueous solution of an alkali-metal sulphite until the disulphide dissolves in the solution, and cooling and recovering the water soluble product of reaction.

4. A process which comprises heating tetramethyl thiuram monosulphide with an aqueous solution of an alkali-metal sulphite until the monosulfide dissolves in the solution, and cooling and recovering the water soluble product of reaction.

5. A vulcanization accelerator obtained according to the process of claim 1.

6. A vulcanization accelerator obtained according to the process of claim 2.

7. A vulcanization accelerator obtained according to the process of claim 3.

8. A vulcanization accelerator obtained according to the process of claim 4.

9. A latex composition containing the water soluble product of reaction resulting from the process of claim 3.

10. A latex composition containing the water soluble product of reaction resulting from the process of claim 4.

11. A process which comprises vulcanizing rubber in the presence of the water soluble product of reaction resulting from the process of claim 3.

12. A process which comprises vulcanizing rubber in the presence of the water soluble product of reaction resulting from the process of claim 4.

LUDWIG MEUSER.